United States Patent [19]

Perlmutter

[11] Patent Number: 5,430,755
[45] Date of Patent: Jul. 4, 1995

[54] PRESSURE-EQUALIZED SELF-COMPENSATING DISCHARGE CONFIGURATION FOR TRIANGULAR RING LASER GYROSCOPES

[75] Inventor: Michael S. Perlmutter, Sherborn, Mass.

[73] Assignee: Northrop Grumman Corporation, Los Angeles, Calif.

[21] Appl. No.: 705,248

[22] Filed: May 24, 1991

[51] Int. Cl.$^6$ .............................................. G01B 9/02
[52] U.S. Cl. ...................................... 372/94; 356/350
[58] Field of Search ...................... 372/94; 356/350

[56] References Cited

U.S. PATENT DOCUMENTS

| | | | |
|---|---|---|---|
| 4,397,027 | 8/1983 | Zampiello et al. | 372/94 |
| 4,847,855 | 7/1989 | Derry et al. | 372/94 |

*Primary Examiner*—Mark Hellner
*Attorney, Agent, or Firm*—Terry J. Anderson; Karl J. Hoch, Jr.

[57] ABSTRACT

A triangular ring laser gyroscope having a single anode, single cathode, and self-compensating discharge path which cancels gyro bias, bias drift, and noise. The discharge path extends from the anode through a cross channel in the center of the gyro block to the cathode. Counter-propagating laser beams traverse one segment of the discharge path in the direction of the Langmuir flow from anode to cathode, and another segment of the discharge path of equal length in a direction opposite to that flow. The Langmuir return flow from cathode to anode occurs along the walls of the gyro cavity, producing a more uniform gas flow velocity in the central region of the discharge path. Drag effects on the counter-propagating laser beams are equal but opposite, and the laser beams traverse a more uniform region of the Langmuir flow when thermally-induced changes in the gyro cause beam wandering. Gyro bias, bias drift, and noise are substantially cancelled.

20 Claims, 2 Drawing Sheets

PRESSURE-EQUALIZED SELF-COMPENSATING DISCHARGE CONFIGURATION FOR TRIANGULAR RING LASER GYROSCOPES

BACKGROUND OF THE INVENTION

This invention relates to triangular ring laser gyroscopes and to canceling gyro bias, bias drifts, and noise in such instruments.

In the early 19th century, Fresnel predicted that the speed of light propagating in a moving medium is a function of the velocity of the medium in the direction of propagation. This very small effect was first observed by Fizeau in 1851. Now known as the Fresnel-Fizeau drag effect, the phenomenon is very difficult to measure by interferometric means, but is easily measured using ring laser gyroscopes. Such gyroscopes are sensitive to the apparent frequency shifts produced in the propagating laser beams by the drag effects of gas flow in the laser's gain medium.

Podgorski and Aronowitz ("Langmuir Flow Effects in the Laser Gyro", IEEE J Quantum Electronics, QE-4, 11–18, 1968) have shown that the equilibrium gas flow in a direct current excited helium-neon laser is caused by a wall effect first explained by Langmuir in 1923. Langmuir established that, in a plasma filled gas discharge tube, the equilibrium gas flow profile is the super-position of two gas flow patterns: a flow along the walls from cathode to anode, and a backflow in the center of the discharge tube from anode to cathode.

The Fresnel-Fizeau drag and Langmuir flow effects discussed above degrade the performance of ring laser gyroscopes in two ways. First, the Fresnel-Fizeau drag effect produces an apparent difference, or bias, between the frequencies of laser beams counter-propagating around the gyro through the Langmuir gas flow regions. Second, the Langmuir flow produces a non-uniform gas flow velocity in the discharge region. As temperature changes cause mirror and cavity deformations, the laser beams move about, or wander, within the discharge region, and randomly traverse the non-linear gas flow regions. Fresnel-Fizeau drag effects on the wandering beams therefore produce drifts or variations in the gyro bias and noise.

A frequency bias and a non-uniform gas flow are not necessarily undesirable, as long as the laser beam path remains fixed relative to the gyro block. In fact, means for establishing a known frequency bias are ordinarily incorporated in ring laser gyro designs to avoid "lock in" effects, since a known bias can be compensated for in laser measurements. However, beam wandering in the non-uniform gas flow region of the discharge path is a source of unpredictable and uncompensable variations and drifts in gyro bias and noise which limit the measurement accuracy of the ring laser gyro.

Present-day triangular ring laser gyros compensate for gyro bias by utilizing symmetric split-discharge configurations in which two anodes are symmetrically located in opposite directions from a common cathode along the optical propagation path. Each of the gyro's counter-propagating laser beams successively encounters two regions of the discharge path, one in which the gas flows in the direction of propagation and another in which the gas flows in the opposite direction. As a result, each counter-propagating beam experiences equal but opposite drag effects which essentially cancel the bias effects.

The successful application of the split-discharge technique requires that the two discharge segments be geometrically equivalent and that the discharge currents in the two segments be equal. Maintaining the necessary precise equality in discharge currents is accomplished by sophisticated electronic control circuitry. Additionally, the split-discharge technique requires dual anodes and their associated seals and a large cathode. These required elements increase the manufacturing complexity and cost of the gyro and reduce its reliability.

Moreover, in conventional split-discharge triangular ring laser gyros, the equilibrium flow of lasing medium gas occurs by Langmuir flow within each segment of the split discharge path. Consequently, beam wandering produces undesirable gyro bias drift and noise even where the bias effects may be canceled by the discharge path configuration.

An alternative technique that achieves bias cancellation without the need for current-balancing circuitry and dual anodes, but for a ring laser gyro having a four-segment and non-coplanar optical path, is described in U.S. Pat. No. 4,397,027, to Zampiello et al. The technique includes a single discharge path such that each counter-propagating laser beam traverses one segment of the discharge path in the same direction as the gas flow and another segment in the opposite direction. The drag effects of the gas flow on laser beam frequency are equal and opposite so that the net bias effect is essentially canceled.

However, the approach of Zampiello et al. cannot be practiced in triangular ring laser gyroscopes, in which the optical path has only three segments and the optical path and the discharge path are inherently coplanar. Moreover, such an approach does not address the reduction of bias drift and noise caused by drag effects and beam wandering. The split-discharge approach of conventional triangular ring laser gyroscopes not only does not reduce bias drifts and noise, but also requires the dual-anode and current balancing circuitry discussed above.

Thus, there is a need in the art for a triangular ring laser gyroscope which cancels gyro bias, gyro bias drifts, and noise, and which eliminates the need for multiple anodes, their associated seals, and current balancing electronics. It is therefore an object of this invention to provide a triangular ring laser gyroscope having a self-compensating single discharge path which substantially cancels bias effects, gyro bias drift, and noise.

SUMMARY OF THE INVENTION

Accordingly, the present invention discloses a triangular ring laser gyroscope in which a triangular cavity having three side channels is formed in the gyro block. A cross channel connecting two side channels of the triangular cavity extends across the central region of the gyro block. A lasing gain medium is confined within the cavity and cross channel. A single anode and single cathode are disposed at selected locations in the block. Upon application of voltage across the anode and cathode, a direct-current discharge is established between them which excites the lasing gain medium and generates lasing radiation. Mirrors at the vertices of the cavity direct the lasing radiation in counter-propagating laser beams around a closed triangular optical path within the cavity. Means for extracting and processing optical energy from the counter-propagating laser beams to produce measurement data are associated with one or more mirrors of the gyro.

The locations of anode, cathode, and cross channel, and the relative lengths and cross-sectional areas and shapes of the cross channel and the side channels, are selected such that a discharge path is established from the anode along a first side channel of the triangular cavity to the cross channel, through the cross channel, and then along a second side channel to the cathode. The discharge path and the optical path are inherently coplanar, and the segments of the discharge path lying along the optical path are essentially equal in length.

Each of the counter-propagating laser beams therefore traverses the central region of one segment of the discharge path in the direction of the Langmuir flow of gas in that region, and also the central region of a second segment in a direction opposite to that flow. The Fresnel-Fizeau drag effects on the propagating laser beams are equal but opposite, and the frequency bias caused by such effects is essentially canceled.

The side channels and cross channel are free of obstructing elements such as Faraday rotators. As a result, an alternative path for the Langmuir wall flow from cathode to anode is provided along the walls of the side channels. The alternate flow path makes the gas flow velocity across the discharge path, and the drag effects caused by that flow, more uniform. As thermally-induced beam wandering occurs in the central regions of the discharge path, the bias drifts and noise caused by drag effects are more nearly equal but opposite and are essentially canceled.

The present invention eliminates the need for current-balancing controls and one anode and its associated seals, and reduces the size of the cathode required to produce the discharge. The accuracy, reliability, and producibility of the ring laser gyro are improved, and its cost is reduced. The discharge path additionally minimizes or avoids the incidence of ultraviolet radiation, produced by the gas discharge, upon the mirrors of the gyro, thereby extending the operating life of the mirrors and improving gyro performance.

DESCRIPTION OF THE PREFERRED EMBODIMENT

Figure 1:
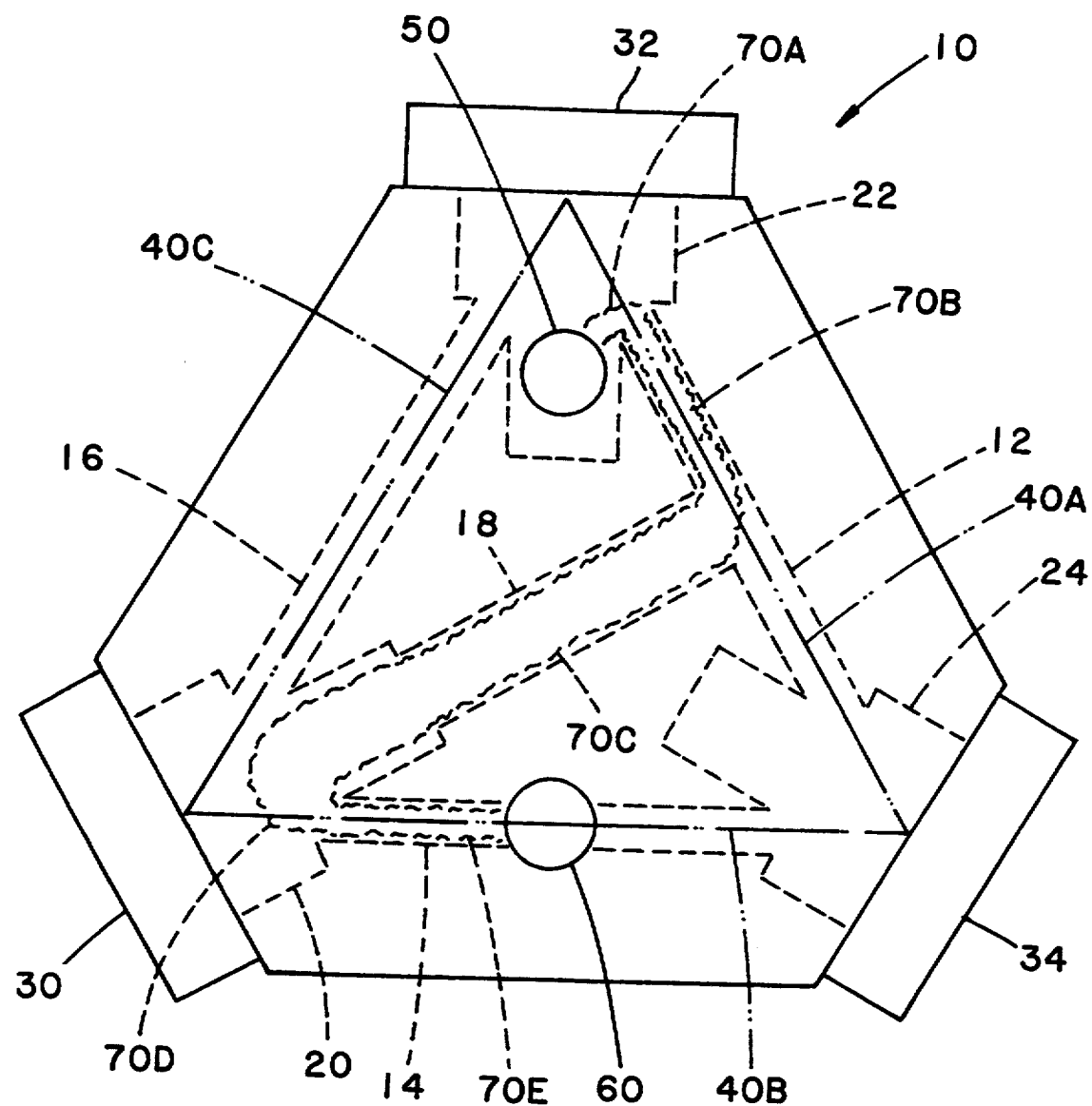
FIG. 1 is a plan view of a triangular ring laser gyroscope as described for the preferred embodiment thereof.

In FIG. 1, there is shown a plan view of a triangular ring laser gyroscope block 10 in which are formed side channels 12, 14, and 16, cross channel 18, and vertex regions 20, 22, and 24. Mirrors 30, 32 and 34 are mounted on gyro block 10 at vertex regions 20, 22, and 24, respectively, and define a closed triangular optical path, consisting of segments 40A, 40B, and 40C, within the side channels and vertex regions for the propagation of laser beams in opposing directions around the optical path. Processing means (not shown) are associated with one or more of mirrors 30, 32, or 34 for extracting optical energy from the counter-propagating laser beams and processing that energy to obtain gyroscope measurements.

Cross channel 18 extends through the central region of gyro block 10 from the mid-point of side channel 12 to its opposite vertex region 20. Side channels 12, 14, and 16 are essentially equal in length, cross-sectional area, and shape. Cross channel 18 has a larger cross-sectional area than each side channel. Side channels 12, 14, and 16 and cross channel 18 are unobstructed by Faraday rotators or other devices. Optical path segments 40A, 40B, and 40C are essentially equal in length. The triangular cavity, cross channel, discharge path, and optical path are coplanar.

The side channels 12, 14, and 16, vertex regions 20, 22, and 24, and cross channel 18 form a lasing medium cavity in which is disposed a lasing medium (not shown). The lasing medium is preferably a mixture of helium and neon gases in a mixture known in the art to produce lasing radiation when excited by a direct-current electrical discharge. Single anode 50 is downwardly disposed in gyro block 10 at vertex region 22 away from mirror 32. Anode bore 51 (not shown) extends downwardly through gyro block 10 from anode 50 to vertex region 22, connecting anode 50 to the lasing medium cavity. Single cathode 60 is downwardly disposed in gyro block 10 at the mid-point of side channel 14. Cathode bore 61 (not shown) extends downwardly through gyro block 10 from cathode 60 to side channel 14, connecting cathode 60 to the lasing medium cavity.

Voltage means (not shown) connected to anode 50 and cathode 60 produces a direct-current discharge path comprised of discharge path segments 70A–70F (70F not shown) in anode bore 51 and vertex region 22, side channel 12, cross channel 18, vertex region 20, side channel 14, and cathode bore 61, respectively. Discharge path segments 70B and 70E comprise gain regions through which the counter-propagating laser beams propagate, and are essentially equal in length.

Gyro block 10 is preferably comprised of a commercially-available material known in the art to have a low thermal coefficient of expansion, so that gyro block deformations, expansions, and contractions are minimized during gyroscope operation, and the path lengths of the triangular optical path are maintained at a constant value. One such material is Zerodur (a trademark of Schott Glasswerke), which also has a low gas permeability. Mirrors 30, 32, and 34 are preferably dielectric mirrors comprising alternating layers of high and low index of refraction materials, the reflective surfaces of which are selected as planar or spherical, and are adjustable with respect to gyro block 10 so as to provide gyroscope and laser beam alignment.

In operation, the voltage applied across anode 50 and cathode 60 produces a direct-current discharge in the lasing medium which extends in a clockwise direction as viewed in FIG. 1 from anode 50 through anode bore 51, vertex region 22, side channel 12, and cross channel 18 to vertex region 20, and from there in a counter-clockwise direction along side channel 14 through cathode bore 61 to cathode 60. The discharge excites the lasing medium to produce lasing radiation which is directed by mirrors 30, 32, and 34 into counter-propagating beams traveling around triangular optical path segments 40A, 40B, and 40C.

Langmuir flow of the lasing medium occurs from anode to cathode in the central region of the discharge path segments 70A through 70F and from cathode to anode along the walls of cathode bore 61, side channel 14, vertex cavity 20, cross channel 18, side channel 12, vertex region 22, and anode bore 51. Additionally, a flow of the lasing medium from cathode to anode occurs along the walls of side channel 16 and side channels 14 and 12 by way of vertex region 24.

Each of the counter-propagating laser beams traversing optical path segments 40A, 40B, and 40C propagates through the central regions of discharge path segments 70B and 70E in the direction of the Langmuir flow in one such segment and opposite to the Langmuir flow in the other segment. The Fresnel-Fizeau drag effects produced in the counter-propagating beams are therefore essentially equal, but opposite, and are substantially canceled.

The Langmuir flow from cathode 60 to anode 50 along the walls of side channels 14 and 12, vertex regions 20 and 22, and cross channel 18 makes the gas flow velocities in the discharge path more uniform. Beam wandering therefore causes the counter-propagating laser beams to drift or wander through central regions of discharge path segments 70B and 70E where the Langmuir flow velocities are more uniform. The Fresnel-Fizeau drag effects on the wandering laser beams are more nearly equal and opposite, substantially canceling the bias drift and noise associated with beam wandering.

Figure 2:
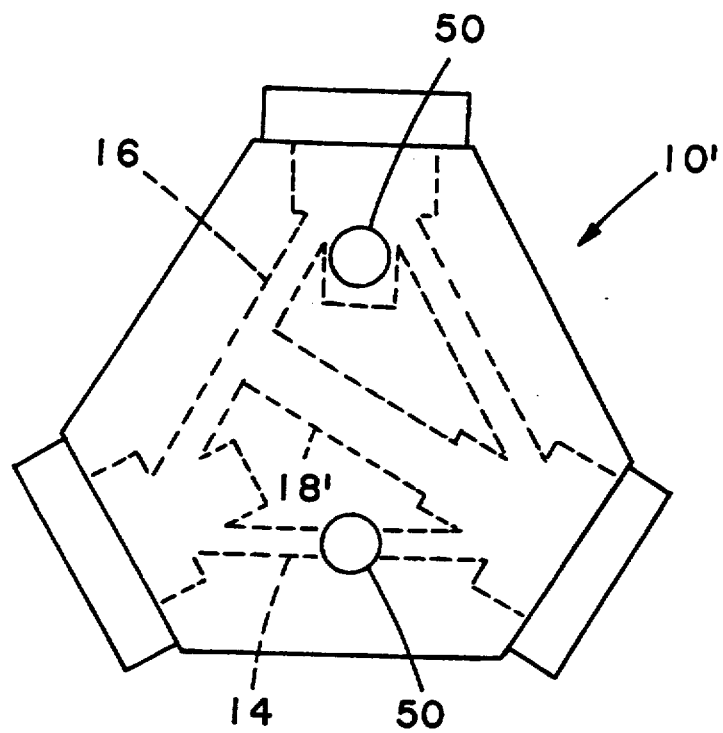
FIG. 2 is a plan view of a triangular ring laser gyroscope embodying an equivalent discharge path to the preferred embodiment.

FIG. 2 shows a ring laser gyro block 10' in which is formed an equivalent, mirror-image discharge path to the preferred embodiment described above, in which the discharge path extends in a counter-clockwise direction from anode 50 through side channel 16 and cross channel 18' and then in a clockwise direction along side channel 14 to cathode 60.

Figure 3:
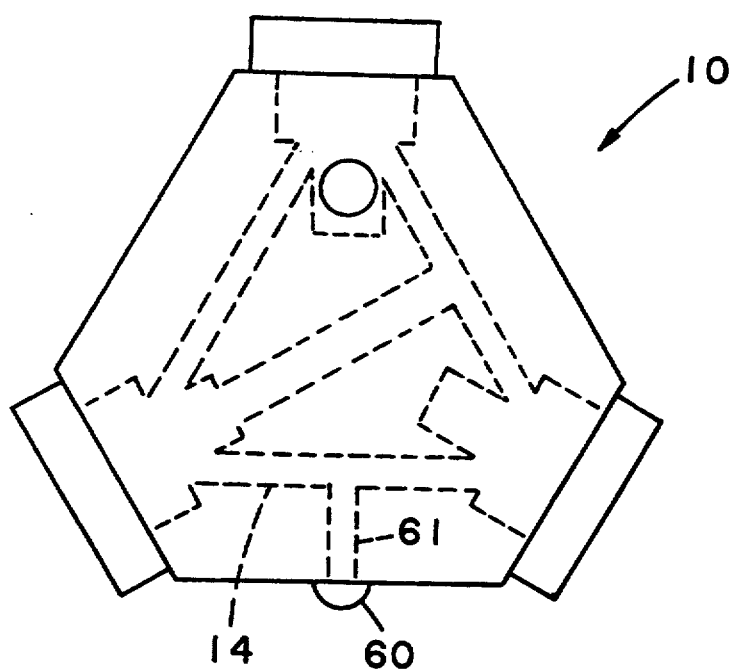
FIG. 3 is a plan view of a triangular ring laser gyroscope embodying the invention wherein the cathode is disposed in the block in the plane of the gyro block.

In FIG. 3, an alternative configuration of the preferred embodiment is shown in which cathode 60 is disposed in gyro block 10 in the plane of gyro block 10, cathode bore 61 extending in the plane of gyro block 10 from cathode 61 to side channel 14.

While the present invention has been disclosed in connection with the preferred embodiment thereof, it is to be understood that there may be other embodiments which fall within the spirit and scope of the invention. Accordingly, this invention is not to be regarded as limited to the embodiments disclosed herein, but is to be limited only as defined by the following claims.

What is claimed is:

1. A triangular ring laser gyroscope, comprising:
   a gyro block having a triangular cavity formed therein, the cavity including adjacent first and second side channels and a cross channel connecting the first side channel and a region of the cavity opposite the first side channel;
   means for producing laser beams counter-propagating around a triangular optical path within the cavity, the producing means including a single anode and a single cathode secured to the gyro block, a flow of a gain medium occurring from the anode to the cathode through central regions of a first segment of the first side channel, the cross channel, and a second segment of the second side channel, a backflow of the gain medium occurring from the cathode to the anode along walls of the triangular cavity whereby a gain medium flow velocity gradient across the first and second segments is reduced, a first counter-propagating laser beam traversing the flow in the first segment in a direction of the flow and traversing the flow in the second segment against the direction of the flow, a second counter-propagating laser beam traversing the flow in the first segment against the direction of the flow and traversing the flow in the second segment in the direction of the flow, the first segment and the second segment being substantially equal in length; and,
   means for processing an energy associated with the counter-propagating laser beams, the processed energy representing a gyro measurement.

2. The triangular ring laser gyroscope of claim 1 wherein the triangular optical path comprises three optical path segments of equal length.

3. The triangular ring laser gyroscope of claim 1 wherein the cross channel connects a mid-point of the first side channel, and wherein further the region of the cavity opposite the first side channel is a vertex region.

4. The triangular ring laser gyroscope of claim 1 wherein the anode is secured to the gyro block inwardly adjacent to a vertex of the triangular optical path opposite the second side channel, and wherein further the cathode is secured to the gyro block at a mid-point of the second side channel.

5. The triangular ring laser gyroscope of claim 1 wherein the anode is secured to the gyro block along the first side channel, and wherein further the cathode is secured to the gyro block along the second side channel.

6. The triangular ring laser gyroscope of claim 1 wherein the anode is secured to the gyro block in a direction normal to the gyro plane.

7. The triangular ring laser gyroscope of claim 1 wherein the anode is secured to the gyro block in a direction coplanar with the gyro plane.

8. The triangular ring laser gyroscope of claim 1 wherein the cathode is secured to the gyro block in a direction normal to the gyro plane.

9. The triangular ring laser gyroscope of claim 1 wherein the cathode is secured to the gyro block in a direction coplanar with the gyro plane.

10. A triangular ring laser gyroscope, comprising:
   a gyro block having a triangular cavity formed therein, the cavity including first, second, and third side channels and a cross channel, the cross channel connecting the first side channel and a region of the cavity opposite the first side channel, the cavity further including first, second, and third vertex regions respectively opposite the first, second, and third side channels, each vertex region connecting associated adjacent side channels;
   first, second, and third mirrors secured to the gyro block at the first, second, and third vertex regions, respectively, the first, second, and third mirrors defining a triangular optical path within the cavity for laser beams counter-propagating around the cavity;
   a single anode secured to the gyro block;
   an anode bore connecting the anode and the cavity;
   a single cathode secured to the gyro block;
   a cathode bore connecting the cathode and the cavity;
   a gain medium confined within the cavity, the gain medium emitting lasing radiation upon excitation by a direct current discharge occurring between the anode and the cathode, the first, second, and third mirrors directing the lasing radiation around the triangular optical path in the counter-propagating laser beams;
   electrical means for producing the direct current discharge connected to the anode and the cathode, the direct current discharge extending in a discharge path from the anode through a first segment of the first side channel, the cross channel, and a second segment of the second side channel to the cathode, a flow of the gain medium occurring from the anode to the cathode in a central region of the discharge path, a backflow of the gain medium occurring from the cathode to the anode along walls of the triangular cavity whereby a gain medium flow velocity gradient across the first and second segments is reduced, a first counter-propagating laser beam traversing a first segment of the flow in a direction of the flow and traversing a second segment of the flow against the direction of the flow, a second counter-propagating laser beam traversing the first segment of the flow against the direction of the flow and traversing the second segment of the flow in the direction of the flow, the first segment of the flow having a length substantially equal to that of the second segment of the flow; and, means for processing an energy associated with the counter-propagating laser beams, the processed energy representing a gyro measurement.

11. The triangular ring laser gyroscope of claim 10 wherein the triangular optical path comprises three optical path segments of equal length.

12. The triangular ring laser gyroscope of claim 10 wherein the cross channel connects a mid-point of the first side channel, and wherein further the region of the cavity opposite the first side channel is the first vertex region.

13. The triangular ring laser gyroscope of claim 10 wherein the anode is secured to the gyro block along the first side channel, and wherein further the cathode is secured to the gyro block along the second side channel.

14. The triangular ring laser gyroscope of claim 10 wherein the anode is secured to the gyro block inwardly adjacent to a vertex of the triangular optical path lying opposite the second side channel, and wherein further the cathode is secured to the gyro block at a mid-point of the second side channel.

15. The triangular ring laser gyroscope of claim 10 wherein the anode is secured to the gyro block in a direction normal to the gyro plane.

16. The triangular ring laser gyroscope of claim 10 wherein the anode is secured to the gyro block in a direction coplanar with the gyro plane.

17. The triangular ring laser gyroscope of claim 10 wherein the cathode is secured to the gyro block in a direction normal to the gyro plane.

18. The triangular ring laser gyroscope of claim 10 wherein the cathode is secured to the gyro block in a direction coplanar with the gyro plane.

19. A method for canceling gyro bias, bias drift, and noise in a single-discharge triangular ring laser gyroscope having a triangular cavity within a gyro block, the cavity including first and second side channels, comprising the steps of:

connecting the first side channel to the second side channel with a cross channel, the cross channel dividing the first and second side channels into segments, a first segment of the first side channel having a length substantially equal to that of a second segment of the second side channel;

disposing a gain medium in the cavity, the gain medium producing lasing radiation upon excitation by a direct current discharge;

producing the direct current discharge between a single anode and a single cathode secured to the gyro block;

directing the direct current discharge from the anode through the first segment of the first side channel, the cross channel, and the second segment of the second side channel to the cathode to generate a flow of the gain medium from the anode to the cathode through central regions of the first segment, the cross channel, and the second segment and a backflow of the lasing medium from the cathode to the anode along walls of the triangular cavity whereby a gain medium flow velocity gradient across the first and second segments is reduced; and, directing the lasing radiation in counter-propagating laser beams around a triangular optical path within the cavity, a first counter-propagating laser beam traversing the flow in the first segment in a direction of the flow and traversing the flow in the second segment against the direction of the flow, and a second counter-propagating laser beam traversing the flow in the first segment against the direction of the flow and traversing the flow in the second segment in the direction of the flow.

20. A triangular ring laser gyroscope, comprising:

a gyro block having a substantially triangular cavity formed therein and a gain medium disposed within the cavity;

means for producing a direct current discharge in the gain medium in a predetermined direction along a discharge path extending between a single anode disposed substantially at a first vertex of the triangular cavity and a single cathode disposed substantially along a first side channel of the triangular cavity opposite from the anode, whereby lasing radiation is produced in the cavity;

means for directing the lasing radiation in two counter-propagating beams around a planar, triangular closed optical path within the cavity, each counter-propagating beam traversing a first segment and a second segment of the discharge path which are substantially equal in length; and, cross channel means for directing the direct current discharge in the predetermined direction, the cross channel means connecting a second vertex of the cavity at an end of the first side channel and a second side channel of the triangular cavity opposite from the second vertex, whereby the direct current discharge extends from the anode through the first segment, the cross channel means, and the second segment to the cathode, a first counter-propagating beam propagates through the first segment of the discharge path in the direction of the direct current discharge and propagates through the second segment of the discharge path in a direction opposite to the direct current discharge, a second counter-propagating beam propagates through the first segment of the discharge path in a direction opposite to the direct current discharge and propagates through the second segment of the discharge path in the direction of the direct current discharge, a flow of the gain medium occurs from the anode to the cathode through central regions of the discharge path, and a backflow of the gain medium occurs from the cathode to the anode along walls of the triangular cavity, and a gain medium flow velocity gradient across the discharge path is reduced.

* * * * *